United States Patent
Buratto et al.

(10) Patent No.: US 8,847,794 B2
(45) Date of Patent: Sep. 30, 2014

(54) METHOD AND DEVICE FOR DISPLAYING METEOROLOGICAL DATA ON AN AIRCRAFT SCREEN

(71) Applicant: Airbus Operations (SAS), Toulouse (FR)

(72) Inventors: Florence Buratto, Plaisance du Touch (FR); Adrien Jarry, Muret (FR); Claire Ollagnon, Montpellier (FR)

(73) Assignee: Airbus Operations SAS, Toulouse (FR)

( * ) Notice: Subject to any disclaimer, the term of this patent is extended or adjusted under 35 U.S.C. 154(b) by 33 days.

(21) Appl. No.: 13/846,239

(22) Filed: Mar. 18, 2013

(65) Prior Publication Data
US 2013/0249712 A1    Sep. 26, 2013

(30) Foreign Application Priority Data

Mar. 20, 2012 (FR) .................... 12 52486

(51) Int. Cl.
- G01C 21/00 (2006.01)
- G08G 5/00 (2006.01)
- G01C 23/00 (2006.01)
- B64D 45/00 (2006.01)
- G01S 13/95 (2006.01)
- B64D 29/02 (2006.01)
- B64D 29/06 (2006.01)

(52) U.S. Cl.
CPC ............ G08G 5/0091 (2013.01); G08G 5/0021 (2013.01); G01C 23/00 (2013.01); B64D 45/00 (2013.01); G01S 13/953 (2013.01); B64D 29/02 (2013.01); B64D 29/06 (2013.01)

USPC .......................................... 340/971

(58) Field of Classification Search
USPC ........... 340/971, 995.1, 990, 945, 601; 701/1, 701/14, 208
See application file for complete search history.

(56) References Cited

U.S. PATENT DOCUMENTS

| | | | |
|---|---|---|---|
| 5,657,009 A * | 8/1997 | Gordon ......................... | 340/968 |
| 8,248,274 B2 * | 8/2012 | Christophe et al. ........... | 340/963 |
| 8,265,806 B2 * | 9/2012 | Coulmeau et al. .............. | 701/14 |
| 2003/0006928 A1 | 1/2003 | Szeto et al. | |
| 2008/0195309 A1 | 8/2008 | Prinzel, III et al. | |
| 2012/0232782 A1 | 9/2012 | Sterkel et al. | |

FOREIGN PATENT DOCUMENTS

EP      2138864      12/2009

OTHER PUBLICATIONS

French Search Report, Dec. 20, 2012.

* cited by examiner

*Primary Examiner* — Phung Nguyen
(74) *Attorney, Agent, or Firm* — Greer, Burns & Crain Ltd.

(57) ABSTRACT

A method and a device for displaying meteorological data on an aircraft screen including generating and displaying on the screen an automatic dynamic transition between a start view and an arrival view, preferably in perspective. The dynamic transition corresponds to a successive display of views between the start view and the arrival view, each view including a symbol indicating the current position of the aircraft and meteorological data.

15 Claims, 4 Drawing Sheets

METHOD AND DEVICE FOR DISPLAYING METEOROLOGICAL DATA ON AN AIRCRAFT SCREEN

CROSS-REFERENCES TO RELATED APPLICATIONS

This application claims the benefit of the French patent application No. 12 52486 filed on Mar. 20, 2012, the entire disclosures of which are incorporated herein by way of reference.

BACKGROUND OF THE INVENTION

The present invention concerns a method and a device for displaying data relating to the meteorological environment of the aircraft on a screen on the flight deck of said aircraft.

It is known that, notably on transport aircraft, such a display is generally provided on navigation screens, namely of the ND (Navigation Display) type in the lateral plane, and of the VD (Vertical Display) type in the vertical plane.

It is also known that a navigation screen of the ND type provides the crew with all the medium and short term data concerning the environment, in order to present the pilots with a lateral navigation status of the aircraft linked with the flight plan. The ND screen also includes several layers of data that the crew can display successively on demand, and notably:
- meteorological data sourced from a weather radar on board the aircraft;
- terrain data sourced either from an onboard database, or from an onboard weather radar through a particular operating mode of the weather radar;
- airport navigational data; and
- a data set linked notably to traffic management and certain warnings.

The display of environmental data inside the flight deck is supplemented by a vertical display supported by the VD screen in order to offer the pilot an additional means of analyzing the environment. The VD screen displays the current position of the aircraft in relation to safe altitudes, the weather, the terrain and the flight path.

The VD screen takes account of a set of vertical sections along the flight path of the aircraft in order to display the terrain, the weather and the safe altitudes. These vertical sections can be defined along the flight plan, along the current flight path or along an azimuth selected at the weather radar.

Furthermore, the onboard radar usually offers the crew different functions to assist them in their tasks of analyzing the meteorological environment in the short and medium term, and notably:
- a meteorological display function;
- a wind shear prediction function;
- a turbulence detection function; and
- a terrain mapping function.

The weather radar detects precipitation in a region ahead of the aircraft through a radar antenna. It moreover continuously scans this volume and stores it in a buffer memory. An extract sourced from this buffer memory is then used to create the display on the ND screen or on the VD screen.

Furthermore, a weather display functionality is known, which allows the pilot to see water precipitation through different levels of intensity symbolized by a corresponding color code. Moreover, several additional functions are usually available for controlling the weather display on the ND screen and on the VD screen, in order to offer the pilots greater flexibility in their analysis of the weather along the horizontal and/or vertical axes.

The weather radar, through the image of horizontal (ND) and vertical (VD) sections, participates in the creation of representations of the meteorological environment, facilitating comprehension thereof. Likewise, warnings with color coding and certain particular geometric shapes allow communication to the crew of the different levels of danger associated with the meteorological environment perceived by the radar antenna.

However, the representations displayed on the ND screen and the VD screen reach a certain limit of utilization when the pilot tries to understand the meteorological environment in a three-dimensional manner, since he must reconstitute this space ahead of the aircraft from a succession of images, using the different modes of the weather display. The representations, displayed in automatic mode on the ND screen and the VD screen, are a fusion of several horizontal and vertical sections.

Consequently, in order to obtain a more detailed representation without fusion, the pilot must perform several scans in one direction then in the other in order to understand how the cloud mass or masses develop around the aircraft. Now, this method requires significant cognitive resources for the duration of this analysis (which can be longer or shorter depending on the context). Moreover, the quality of the reconstruction of this mental image in three dimensions requires a non-negligible skill in the combined use of the ND and VD screens and of the display modes.

SUMMARY OF THE INVENTION

The object of the present invention is to remedy the above-mentioned disadvantages. It concerns a method for displaying meteorological data on an aircraft screen, which allows improved quality and availability of the data in the aim of improving the mental representation made by the pilot of the meteorological environment.

To this effect, according to the invention, said method for displaying meteorological data on an aircraft screen, method according to which, in an automatic manner:
- meteorological data are received in real time; and
- at least one display is provided of a plan view including a symbol indicating the current position of the aircraft and meteorological data represented in a plane,
is remarkable in that:
- a display is provided of a perspective view comprising a symbol indicating the current position of the aircraft and meteorological data, said perspective view being a unique graphic representation displaying a set of data contained in at least two plan views;
- a start view and an arrival view are provided, each corresponding to a different one of said plan and perspective views; and
- on activating a transition, a dynamic transition between said start view and said arrival view is generated and displayed on said (same) screen, this dynamic transition corresponding to a successive display of views including at least one intermediate view between said start view and said arrival view and implementing a set of geometric transformations (such as rotational, translational, and/or homothetic), said dynamic transition presenting a given execution speed and duration.

Thus, thanks to the invention, there is displayed on a screen, for example, of the ND or VD type, meteorological data measured in real time in the form of an animation or dynamic transition (automatic), generally starting from a plan view (horizontal or vertical) in order to arrive at a perspective view, the opposite also being nevertheless possible within the framework of the present invention.

Preferably, this dynamic transition (automatic) presents a number of intermediate views and a scrolling speed that are such that a human observer can view a continuous movement of the display between the start view and the arrival view as he watches the screen.

This dynamic transition (between the plan and perspective views) allows the pilot to read, rapidly and with few cognitive resources, a naturally interpretable representation of the meteorological environment situated ahead of the aircraft, a representation that is at once complete and all-encompassing.

Thus, thanks to the invention, the pilot has the ability to construct a three-dimensional mental representation of the outside environment, notably in relation to the planned flight path the aircraft will execute.

In the preferred embodiment (with a transition from a plan view to a perspective view), the arrival view (in perspective) is formed according to the invention such that it allows a clear display of the spatial position (hence both in the horizontal and in the vertical plane) of the cloud cells present in relation to the current position of the aircraft and in relation to the planned flight path. This allows the pilot to know precisely if the planned flight will be exposed to meteorological perturbations and allows him to perform an avoidance of the dangerous areas.

Advantageously:
said perspective view is formed from definition parameters that can be controlled by an operator; and
said plan view is a horizontal section viewed from above (of the ND type), or a vertical section viewed from the side (of the VD type).

Moreover, in an advantageous manner, said geometric transformations implemented during the dynamic transition include at least some of the following transformations:
rotational;
translational;
homothetic.

Furthermore, in a particular embodiment, a view called a sister view is provided, which corresponds to a perspective view comprising a symbol indicating the current position of the aircraft and meteorological data. Said sister view is preferably generated from an initial view, some of the definition parameters of which, which can be controlled by an operator, have been modified.

In this case, in a first variant embodiment, on a (first) appropriate auxiliary activation, a dynamic transition is displayed on said screen in order to arrive at this sister view from one of the following views:
said arrival view;
an auxiliary sister view, that is to say another sister view (which corresponds to another perspective view comprising a symbol indicating the current position of the aircraft and meteorological data).

Moreover, in a second variant embodiment, on a (second) appropriate auxiliary activation, a dynamic transition is displayed on said screen in order, from such a sister view, to arrive at one of the following views:
said start view;
said arrival view;
an auxiliary sister view.

Moreover, in an advantageous manner, at least some of the following criteria are taken into account to generate said dynamic transition:
some characteristics of the aircraft;
the current position of the aircraft and the flight phase entered into;
the planned flight path of the aircraft;
the distribution of precipitation in relation to the current position of the aircraft and to the planned flight path;
wind direction and strength;
the displacement and movement of precipitation cells; and
possible avoidance maneuvers.

The present invention also concerns a device for displaying meteorological data measured in real time on an aircraft screen.

According to the invention, said display device, of the type comprising in addition to said screen:
means for receiving meteorological data measured in real time; and
means for generating at least one display of a plan view comprising a symbol indicating the current position of the aircraft and meteorological data represented in a plane,
is remarkable in that it additionally comprises:
means for generating a display of a perspective view comprising a symbol indicating the current position of the aircraft and meteorological data, said perspective view being a unique graphic representation displaying a set of data contained in at least two plan views;
means for performing an activation of a transition; and
means for, during an activation, automatically generating and displaying on said screen a dynamic transition between a start view and an arrival view, each corresponding to a different one of said plan and perspective views, this dynamic transition corresponding to a successive display of views including at least one intermediate view between said start view and said arrival view and implementing a set of geometric transformations, said dynamic transition presenting a given execution speed and duration.

Moreover, advantageously, said display device additionally comprises:
means for generating meteorological data in real time; and/or
means allowing an operator to control parameters (notably definition parameters of a view) that are used by the device; and/or
means allowing an automatic supply of parameters (notably relative to the aircraft and its environment) to said device, which are sourced from onboard means or means outside the aircraft, notably ground means.

As indicated above, a mental representation of the meteorological environment, imprecise, degraded and/or incorrect, could have a more or less significant impact on the set of decision and action processes a pilot will subsequently implement. The improvement, thanks to the device conforming to the invention, in the mental representation of the meteorological environment made by the pilot, therefore improves all of the functions supported by this representation.

Furthermore, in a particular embodiment, said device is capable of displaying, on the screen, a dynamic transition relative to a view called a sister view corresponding to a perspective view comprising a symbol indicating the current position of the aircraft and meteorological data.

The present invention moreover concerns an aircraft, in particular, a transport aircraft that is equipped with a display device such as that mentioned previously.

BRIEF DESCRIPTION OF THE DRAWINGS

The figures of the appended diagram will provide an understanding of how the invention may be embodied. Identical reference numbers in these figures designate similar items.

DETAILED DESCRIPTION OF THE PREFERRED EMBODIMENTS

Figure 1:
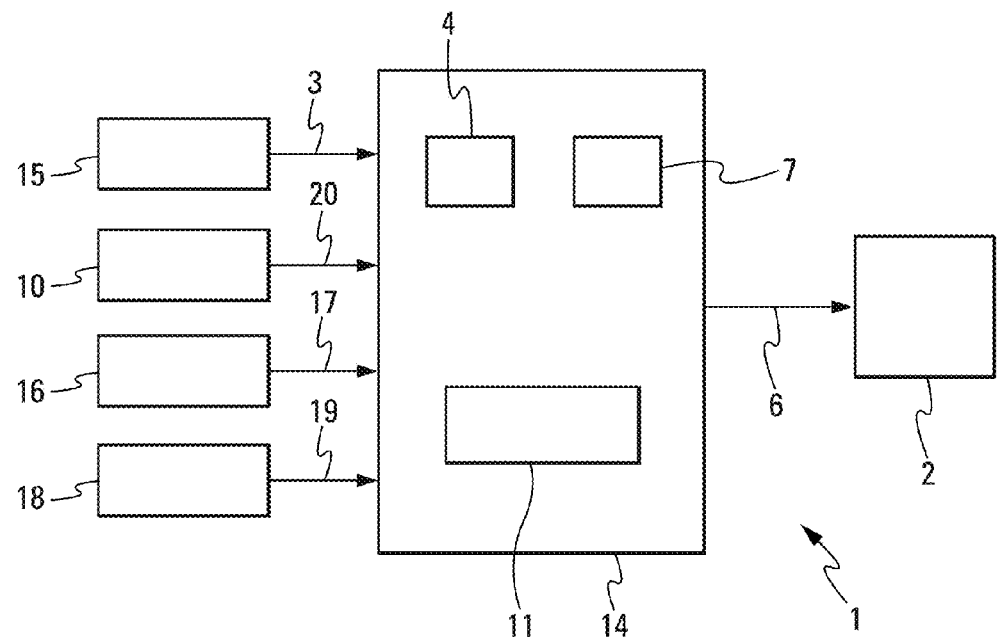
FIG. 1 is a synoptic diagram of a display device conforming to the invention.

The display device 1 conforming to the invention and shown diagrammatically in FIG. 1 is installed onboard an aircraft AC, in particular, a transport aircraft, and is intended to display meteorological data determined in real time on a screen 2 of this aircraft AC.

This display device 1 is of the type comprising:
means 3 for receiving meteorological data in real time;
means 4 for generating at least one display of a plan view (vertical or horizontal) comprising a symbol 5 indicating the current position of the aircraft AC and meteorological data 8 represented in a plane (FIG. 3); and
at least one screen 2, which is capable of displaying views generated by the means 4 and received by a link 6.

Said display device 1 can comprise one or more screens 2 and, preferably, at least one of the following screens:
a navigation screen of the ND (Navigation Display) type relative to the lateral plane;
a navigation screen of the VD (Vertical Display) type relative to the vertical plane.

According to the invention, the object of the display device 1 is notably to improve the quality and availability of the meteorological data in order to allow a pilot to improve the mental representation he makes of the meteorological environment of the aircraft AC.

Figure 4:
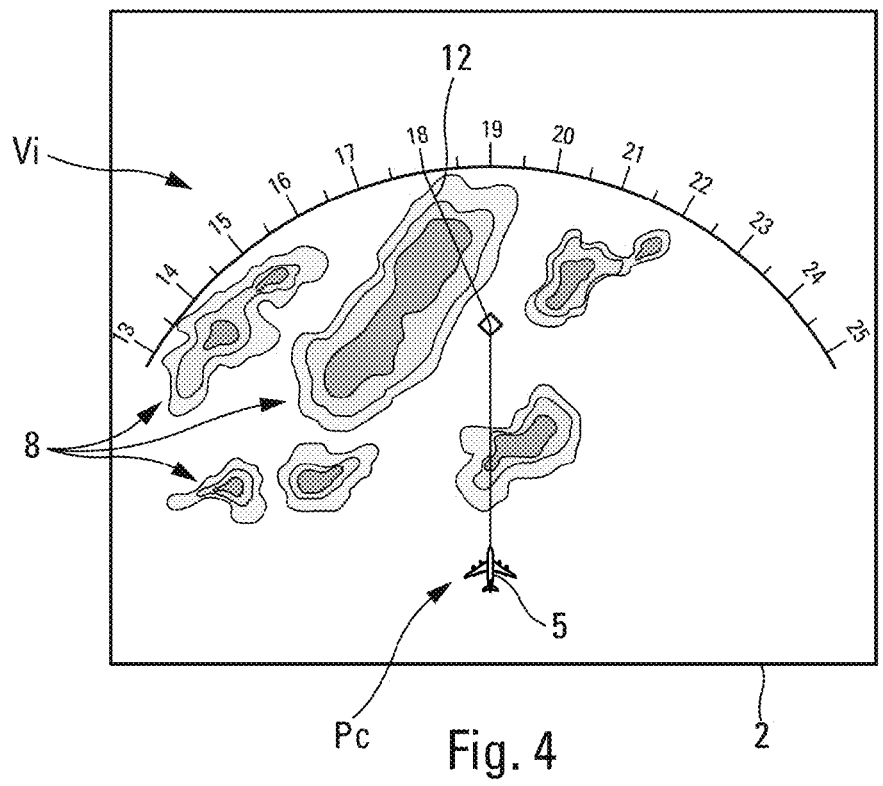
FIGS. 4 to 8 are diagrams illustrating different successive views of a dynamic transition conforming to the invention, starting from a view such as that shown in FIG. 3.
Figure 5:
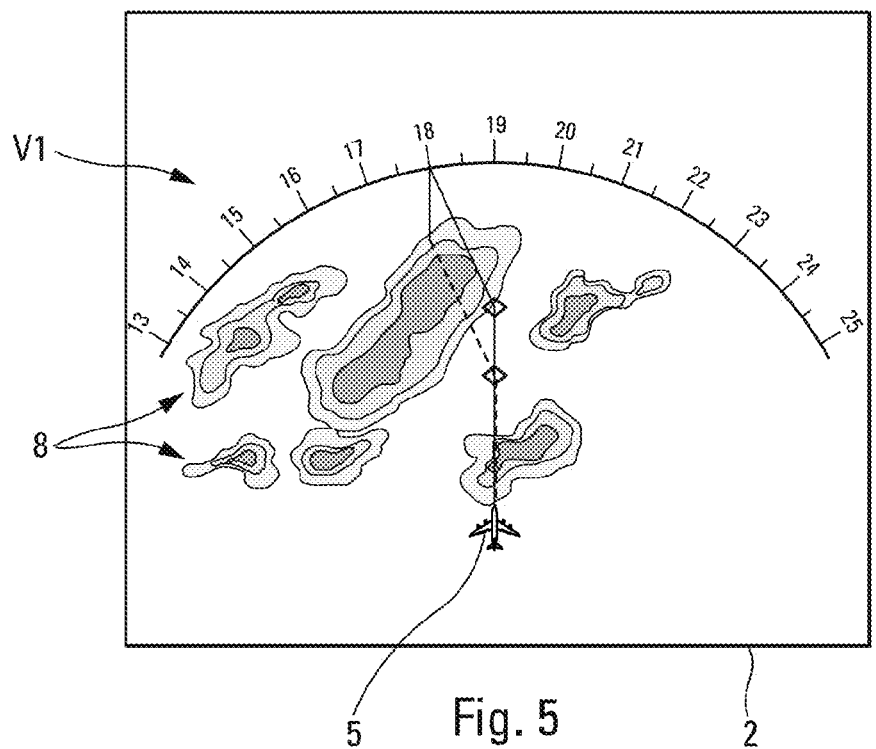
Figure 6:
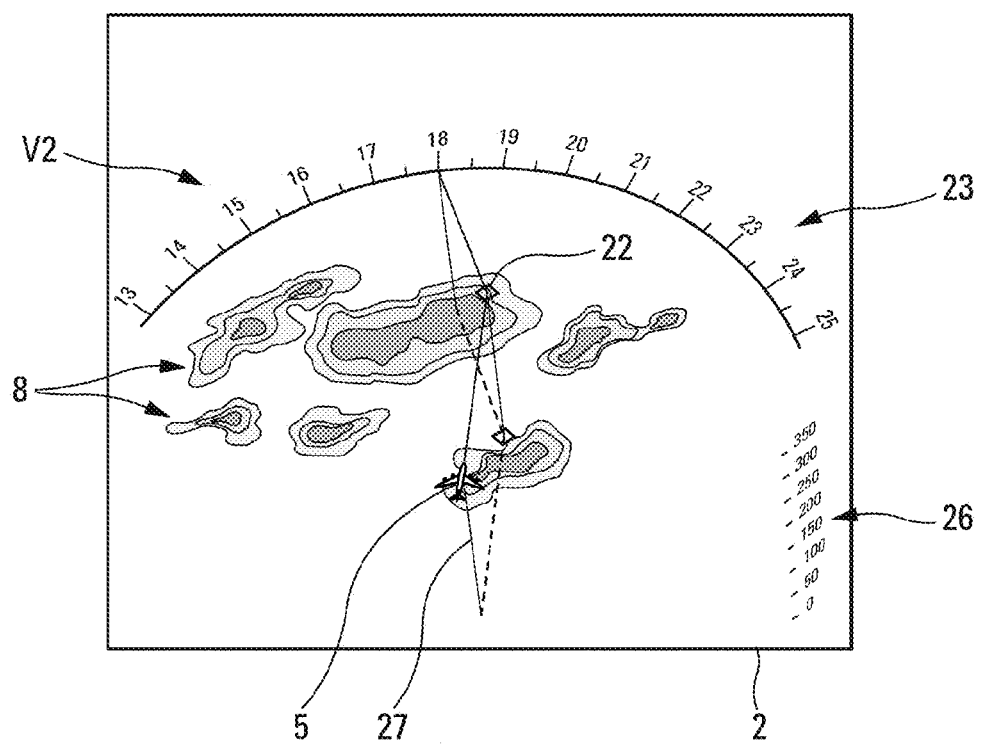
Figure 7:
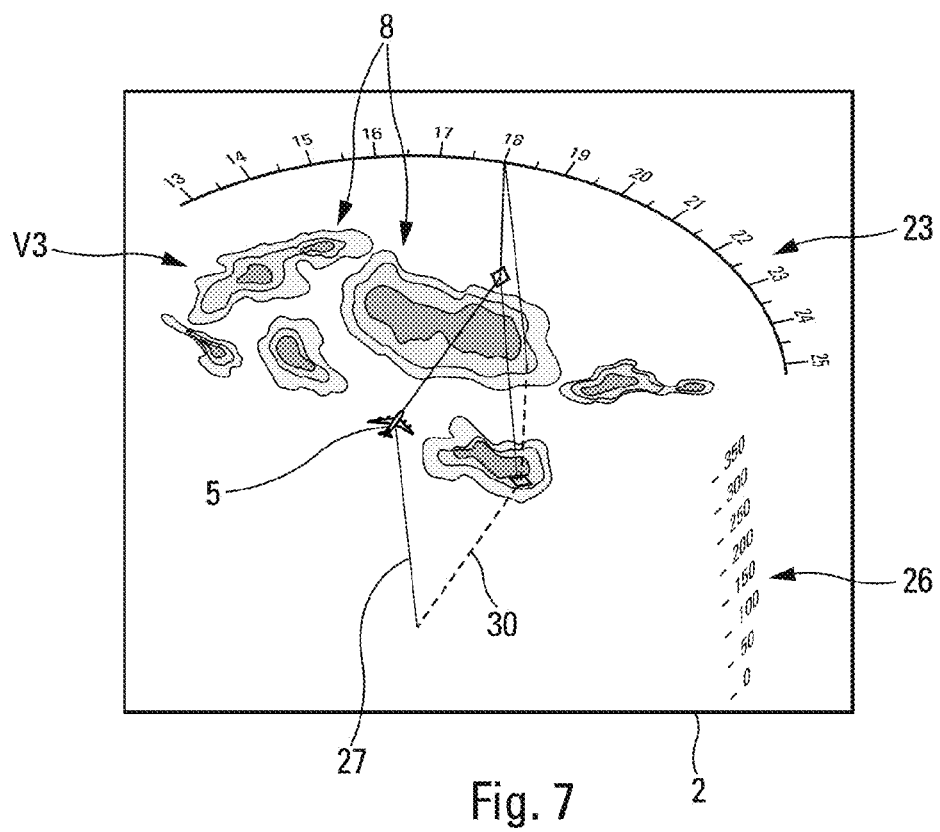

To achieve this, the display device 1 also comprises:
means 7 for generating a display of a perspective view (FIG. 8) comprising a symbol 5 indicating the current position of the aircraft AC and meteorological data 8. This perspective view is a unique graphic representation displaying a set of data contained in at least two plan views;
means 10 for performing an activation of a transition; and
means 11 for automatically generating a dynamic transition that will be displayed automatically on the screen 2 between a start view Vi and an arrival view Vf. This dynamic transition corresponds to a successive display of views (some of which are represented for illustration purposes relative to a particular example on FIGS. 4 to 8), including at least one intermediate view V1, V2, V3 (FIGS. 5 to 7) between said start view Vi (FIG. 4) and said arrival view Vf (FIG. 8) and implementing a set of geometric transformations, said dynamic transition presenting a given execution speed and duration.

The display device 1 conforming to the invention thus displays on a screen 2, for example of ND or VD type, meteorological data measured in real time, in the form of an animation or dynamic transition (automatic), generally starting from a plan view (horizontal or vertical) in order to arrive at a perspective view, the opposite also being nevertheless possible.

This dynamic transition preferably presents a number of intermediate views (V1, V2, V3 etc.) and a scrolling speed that are such that a human observer can view a continuous evolution of the display between the start view Vi and the arrival view Vf.

This dynamic transition (between the plan and perspective views) allows the pilot to read, rapidly and with few cognitive resources, a naturally interpretable representation of the meteorological environment situated ahead of the aircraft AC, a representation that is at once complete and all-encompassing.

Thus, thanks to the display implemented by the device 1 conforming to the invention, the pilot has the ability to construct a three-dimensional mental representation of the outside environment, notably in relation to the planned flight path the aircraft AC will follow.

The term "mental representation" can be defined as the image created by an individual of a situation, bringing into play at the same time sensations (visual perception, sensation of acceleration, of movement etc.) and memory (experience, learned rules and procedures). Thus, depending on the context, the information and sensations perceived by the pilot will trigger the activation of information, of processes held in memory so that he can analyze the impact of the weather and therefore react in an appropriate manner to ensure flight safety and the comfort of the passengers. This mental (or cognitive) representation activity lies in the domain of the symbolic, that is to say, in his reasoning of the analysis, the pilot will only manipulate variables and synthetic and diagrammatic parameters (virtual, abstract) representing real objects or representations of real objects.

Figure 8:
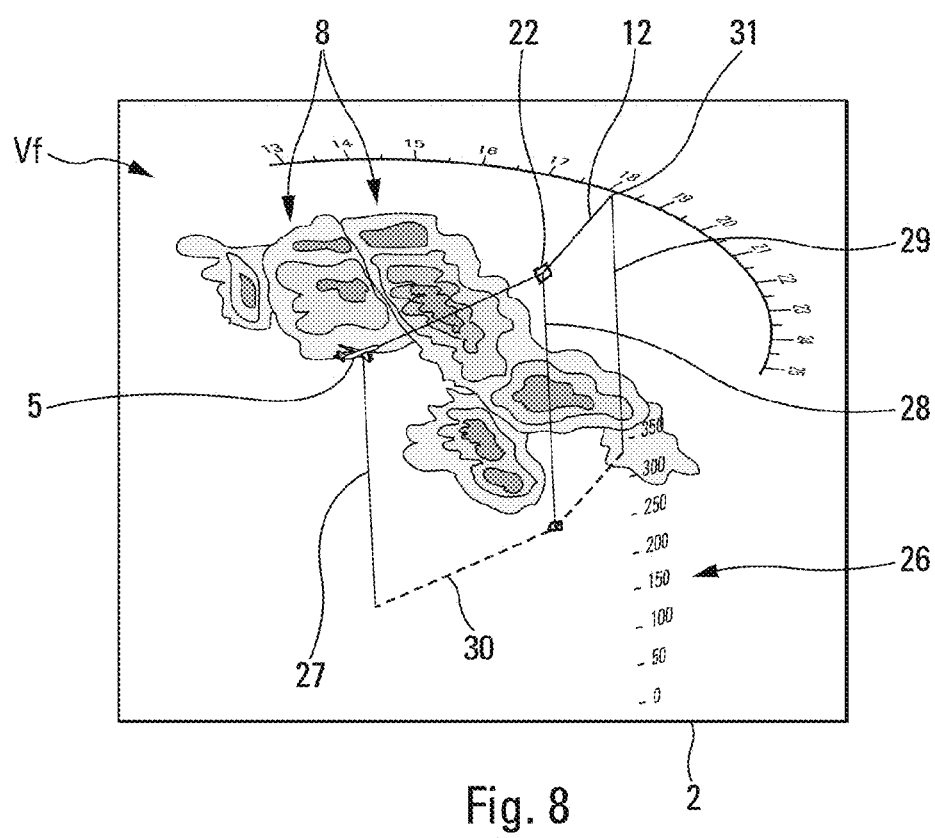

In the preferred embodiment (with a transition from a plan view to a perspective view), the arrival view Vf (in perspective) is formed according to the invention such that it allows a clear display of the spatial position (hence both in the vertical and in the horizontal plane) of the cloud cells 8 present in relation to the current position of the aircraft AC and in relation to the planned flight path 12 of the aircraft AC as represented in FIG. 8. This allows the pilot to know precisely if the planned flight will be exposed to meteorological disturbances and allows him to perform an avoidance of the dangerous areas if he judges this to be appropriate.

Said means 4, 7 and 11 are preferably a part of a processing unit 14 of the display device 1.

Moreover, said display device 1 also comprises:
means 15 which are connected through the link 3 to the processing unit 14 and which are formed so as to generate meteorological data in real time. Said means 15 notably include an onboard weather radar and means outside the aircraft, which are capable of transmitting meteorological data (the link 3 can in this case be a standard data transmission link between a ground station and the onboard device 1);
means 16 which are connected through a link 17 to the processing unit 14 and which are formed so as to allow an operator to enter parameters into the device 1, in particular in order to control definition parameters of a view. These means 16 comprise, for example, a keyboard and/or a computer mouse, which are associated with a screen, or any other standard means enabling data entries.
means 18 which are connected through a link 19 to the processing unit 14 and which are formed so as automatically to supply parameters (relative notably to the aircraft and the environment) to said device 1; and
said means 10 which are connected through a link 20 to the processing unit 14 in order to activate (or trigger) the dynamic transition. The activation of this dynamic transition, in particular between a plan view and a perspective view, is managed, either manually by an action of the pilot on a component (for example, a button) that is a part of the means 10, or automatically by a system that is a part of the means 10. This activation can be performed, notably automatically, depending on a certain number of criteria, such as, for example, the activation of a warning or of a simple notification.

Said means 15, which are intended to generate meteorological data in real time, can therefore comprise standard systems (and notably, a weather radar) installed on board the aircraft AC, and likewise, standard external sources in so far as all of the meteorological data share a common frame of reference, at the same time respecting a certain number of constraints so that the data are compatible (same time space and same geographical region). An external source can then provide information complementing, additional to or replacing the meteorological data supplied by the radar installed onboard the aircraft AC.

The three-dimensional space to analyze is defined, either by means, not represented, of the device 1, or by the pilot, using the means 16 for example. By default, this space is equal to the space captured by the weather radar in connection with the scale selected on the screen 2 and the position of the aircraft AC.

Figure 2:
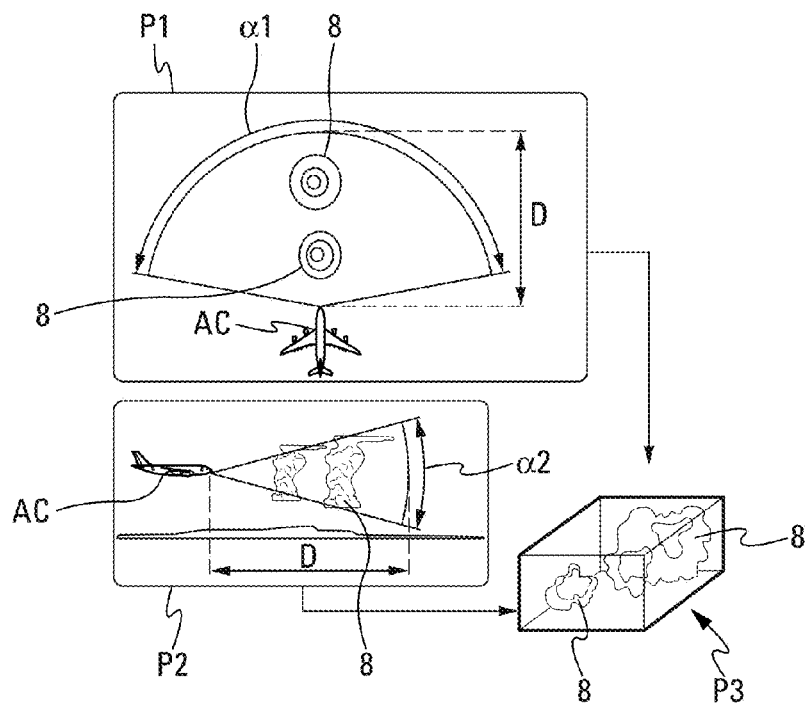
FIG. 2 is a diagram showing the scanning performed by a weather radar.

The weather radar, which is a part of the means 15, detects precipitation ahead of the aircraft AC through a radar antenna, up to a distance D, for example 320 NM, ahead of the aircraft AC, as represented in FIG. 2. This FIG. 2 shows:
- a part P1 illustrating a radar scan in the horizontal plane according to an angle α1, 160° (±80°), for example;
- a part P2 illustrating a radar scan in the vertical plane according to an angle α2, 30° (±15°) for example; and
- a part P3 illustrating a corresponding representation, obtained from said horizontal and vertical scans, of the space in 3D showing two cloud cells 8.

Figure 3:
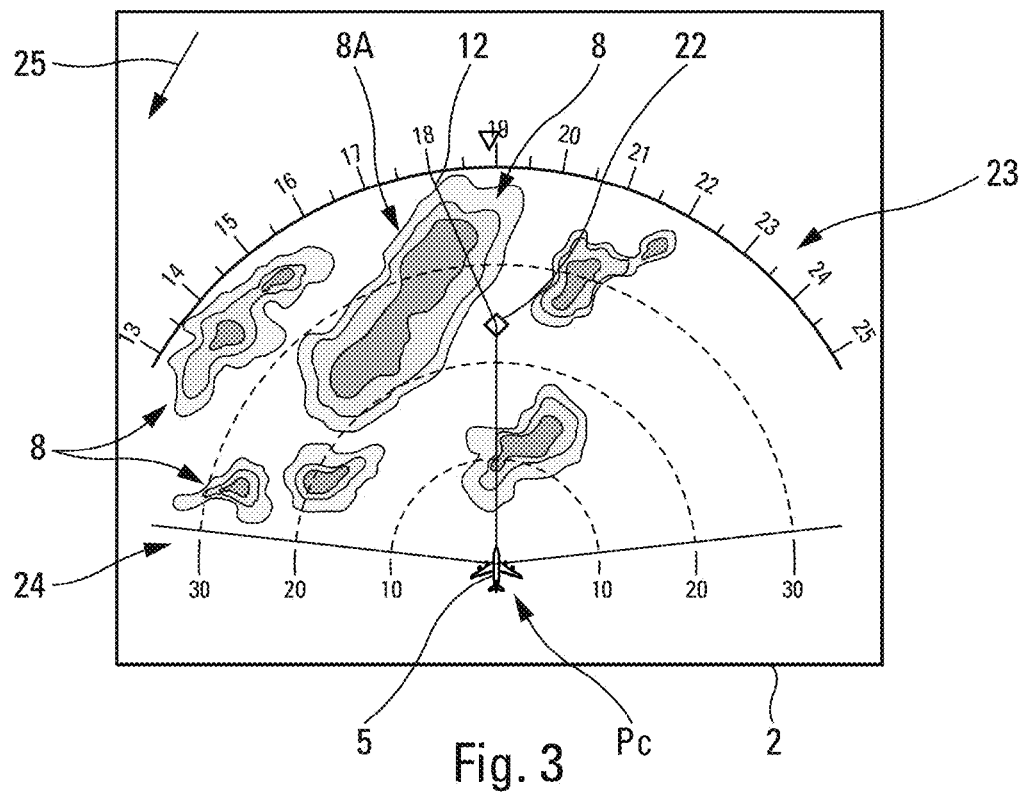
FIG. 3 is a diagram illustrating a horizontal plan view of a standard display on a navigation screen, showing meteorological data.

Furthermore, by default:
- the start view Vi is either the representation of the meteorological environment displayed on a ND screen (horizontal section—viewed from above) as represented in FIG. 3, or that displayed on a VD screen (vertical section—side view); and
- the arrival view Vf is a perspective view, defined by a certain number of criteria which are dependent or not upon the context (type of mission, flight plan, flight path, intensity of the meteorological phenomena, intensity of traffic, type of regions flown over etc.) in which the aircraft AC is situated.

It is also conceivable, within the framework of the present invention, to define the start view as a perspective view and the arrival view as a plan view.

The parameters defining the characteristics of the arrival view Vf can be adjusted and modified or not by the pilot and/or the airline (notably through the means 10) according to the needs.

Moreover, the means 11 of the device 1 take account of at least some of the following criteria to generate said dynamic transition:
- some characteristics of the aircraft AC,
- the current (present) position Pc of the aircraft AC and the flight phase entered into;
- the planned flight path 12 of the aircraft AC;
- the distribution of precipitation in relation to the current position Pc of the aircraft AC and to the planned flight path 12;
- wind direction and strength
- the displacement and movement of precipitation cells 8; and
- possible avoidance maneuvers.

The dynamic transition (automatic) can be more or less rapid, with or without variations of rhythm, and follows the rapidity required by the pilot (manual control) or that defined in the device 1. The dynamic transition is composed of:
- a certain number of images with a minimum of three images, which are the start view Vi, the arrival view Vf and an intermediate view V1, V2, V3 between the start view Vi and the arrival view Vf;
- an execution speed, that is to say the rapidity of the succession of the images that make up the dynamic transition. The control of the execution speed is managed by the pilot and/or by the device 1 itself;
- a duration, which is at the same time linked with the execution speed of the dynamic transition and with the degree of separation (difference) between the start view Vi and the arrival view Vf. The duration of the dynamic transition (animation) will be shorter if the arrival view Vf is close to the start view Vi, with the hypothesis that a constant execution speed is maintained. Likewise, the overall duration can be pre-constrained or not by the pilot and/or the device 1; and
- a set of different successive geometric transformations, notably rotational, translational and/or homothetic.

The rotation or rotations implemented as the case arises can be more or less complex with a center and a direction of rotation, which can be:
- defined beforehand by the device 1, the airline and/or the crew (notably through the means 16) before triggering the dynamic transition (dynamic transition by default); and
- fixed and invariable; or
- modifiable by the device 1 and/or the crew (for example, displacement of the center of rotation according to a predetermined flight path).

Once the dynamic transition has finished, that is to say, once the arrival view Vf is displayed on the screen 2, the pilot has the option of modifying it according to a certain number of parameters, in order notably to be able to perform rotation actions and thus to obtain a new perspective view. This new perspective view is called "sister view" of the arrival view. A dynamic transition (animation) is also displayed on the screen 2 when the pilot performs an appropriate activation through the means 10. This sister view corresponds to a perspective view comprising a symbol indicating the current position of the aircraft AC and meteorological data.

The device 1 also allows the pilot to pass from one sister view to another sister view, while continuing to benefit from a dynamic transition between these two views.

Consequently, in a first variant embodiment, on an appropriate activation through the means 10, the device 1 displays on the screen 2 a dynamic transition to arrive at a sister view starting from one of the following views:
- said arrival view Vf; or
- an auxiliary sister view.

The device 1 moreover allows the pilot to display once again the arrival view Vf from any sister view, while still having a dynamic transition between these two views.

In the same manner, the device 1 allows the pilot to return to the start view Vi from any sister view or from the arrival view Vf, while still also having a dynamic transition between these two views.

The return to the start view Vi is triggered by the pilot and/or by a system onboard the aircraft depending on a certain number of criteria, such as, for example, the activation of a warning or of a simple notification.

Consequently, in a second variant embodiment, on an appropriate activation through the means 10, the device 1 displays on the screen 2 a dynamic transition in order, from a sister view, to arrive at one of the following views:
- said start view;
- said arrival view; or
- an auxiliary sister view.

The different perspective views (arrival view and the sister views) can be composed from several graphic representation techniques, more or less technologically advanced, ranging from the use of simple dots, lines or symbols to the use of representations in 3D making maximum use of digital display capabilities.

The perspective views can be composed and assembled by a continuous (or discreet) set of plan views The graphic rendering of these perspective views is therefore defined by a set of parameters, initially defined, but which can (or not) be modified by the airline or by the pilot in real time.

In order to create the display conforming to the invention, there is implemented the set of the following stages, consisting of:
- receiving meteorological data from different sources 15 in real time;
- defining the area to analyze in relation to the position Pc of the aircraft AC;
- displaying on the screen 2 the meteorological data contained in this area through a plan view;
- adjusting the display of this graphic representation if necessary;
- selecting the start point of the transition and triggering (through the means 10) the dynamic transition in order to obtain an arrival view in perspective;
- controlling and watching the running of the dynamic transition;
- displaying the arrival view Vf in perspective (FIG. 8);
- adjusting the display of this graphic representation if necessary; and
- if this perspective view is appropriate:
  - keeping this perspective view displayed; and possibly returning to the start view with a dynamic transition, and
- if not, obtaining a new perspective view with a dynamic transition between these two perspective views.

For illustration purposes, the application of the invention to a particular situation of the aircraft AC equipped with the device 1 is described below. The aircraft AC is in a cruise phase above a mountain range (the Alps), near a waypoint 22 MOBLO. FIG. 3 is a representation of a standard display on the screen 2 (of the ND type), which comprises a heading scale 23 and a distance scale 24, on which the current position of the aircraft AC (symbol 5), together with its flight path 12 are displayed in the foreground.

A representation 8 of the meteorological data captured by the weather radar is displayed in the second foreground. In this example, all the weather is considered pertinent in relation to the altitude of the aircraft AC and its future flight path 12. The different densities of precipitation can be represented by a code (of colors) illustrated on FIGS. 3 to 8 by areas in lighter or darker gray.

Finally, a terrain layer can be placed in the background, illustrated for example by a flat tint of contour lines colored brown and blue areas for stretches of water. This terrain layer is not represented in FIG. 3 (and FIGS. 4 to 8) for reasons of clarity of the representation.

As it can be noted, the flight path 12 of the aircraft AC encounters a cloud mass 8A after the waypoint 22 (MOBLO). This cloud mass 8A is the fusion representation of several images viewed from above. The pilot then decides to trigger, through the means 10, a dynamic transition in order to obtain a perspective view Vf of the meteorological situation lying ahead of the aircraft AC.

Within the framework of the present example, the arrival view Vf is defined as a function of at least some of the following criteria:
- the characteristics of the aircraft AC. For this illustration, the hypothesis is taken that the crew is at the controls of a transport aircraft AC, having no malfunction that might possibly affect its performance and its flight envelope (with, for example, a maximum flying altitude of 39,000 feet);
- the current position Pc of the aircraft AC and the flight phase entered into, namely a cruise phase at flight level 35,000 feet (FL 350) over the Alps. Consequently, in order to transcribe this high altitude notion into the arrival view, the symbol 5 of the aircraft AC will preferably be located in the top part of the image;
- the planned flight path 12 of the aircraft AC. The flight path of the aircraft AC is directed straight ahead on the heading 190° up to the waypoint 22 (MOBLO), then it banks left onto the heading 180° after this waypoint 22 (MOBLO);
- the distribution of precipitation in relation to;
  - the current position Pc of the aircraft AC. The different precipitation cells 8 are located for the most part on the left and ahead in relation to the orientation of the aircraft AC;
  - the planned flight path 12 of the aircraft AC. The different precipitation cells 8 are almost all situated left of the flight path 12;
- the wind direction and strength. In the example, the aircraft AC faces a wind coming from the heading 225°, of medium strength, symbolized by an arrow 25 in the top left corner of FIG. 3. The consequence of this is that the precipitation cells 8 are displaced towards the heading 45°, that is to say, towards the left and in the opposite direction to the displacement of the aircraft AC;
- the displacement and movement of the precipitation cells 8. Apart from the evolving displacement caused by the wind direction and strength, the precipitation cells have no particularly great dynamic movement of their own. Their vertical movement is relatively slow, as are their growth and their reduction in volume; and
- possible avoidance maneuvers the crew can execute. On account of the flight level, the localization of the precipitation cells 8 detected by the weather radar and the characteristics of the aircraft AC, a high probability exists that the crew considers avoiding the cloud mass 8A situated after the waypoint MOBLO, preferably by a sideways avoidance.

Based on these criteria, the means 11 define the dynamic transition (animation) in the following manner:
- the visual transition must, in a first period, effect a rotation for the most part forwards and very slightly to the left in order to lift the aircraft symbol 5 of the screen 2 (ND) into the top part of this screen 2 (in order notably to transcribe the notion of altitude); then
- in a second period, the dynamic transition will place more emphasis on a left sideways rotation (clockwise rotation), while reducing the size of the rotation forwards.

The perspective view (arrival view Vf) obtained in this way (FIG. 8) is a right aft three-quarters view, in which the aircraft symbol 5 is situated in the top half of the view Vf. An altitude scale 26 (expressed in flight level FL) has also been represented in FIGS. 6 to 8. For this example, we proceed as follows to create the view:

defusing of the image displayed on the ND screen 2;

superposition of several horizontal sections of the radar image at different flight levels, while remaining in view from above; and dynamic and continuous rotation forwards and to the left, while leaving the initial representation as a projection on the ground. The link between this projection 30 and the arrival view is notably strengthened by three vertical lines 27, 28, 29 starting from the symbol 5, from the waypoint 5 (MOBLO) and from the last point on the flight path 31 displayed on the screen 2.

As can be seen in the sequence of images of FIGS. 4 to 8 illustrating this rotation, the cloud mass 8A (after MOBLO), initially perceived on the trajectory 12 of the aircraft AC is in reality situated below the latter by reason of a particular shape.

The fact of being able to visualize this dynamic transition between these two views Vi and Vf allows the crew rapidly to acquire a general awareness of the environment in which the aircraft AC is moving. Moreover, the absence of any utilization of modes of the radar to analyze this environment allows the crew to perform other tasks during this time.

Although the present invention has been described in connection with various embodiments, it will be appreciated from the specification that various combinations of elements, variations or improvements therein may be made, and are within the scope of the invention.

The invention claimed is:

1. A method for displaying meteorological data on an aircraft screen, comprising the steps:
    receiving meteorological data that are capable of being displayed on the screen in real time;
    providing at least one display of a plan view comprising a symbol indicating the current position of the aircraft; and
    providing a display of a perspective view including a symbol indicating the current position of the aircraft, wherein:
        said plan view comprises meteorological data represented in a plane;
        said perspective view, which comprises meteorological data, is a unique graphic representation displaying a set of data contained in at least two plan views;
    providing a start view and an arrival view, each corresponding to a different one of said plan and perspective views; and
    automatically generating a dynamic transition between said start view and said arrival view upon activating a transition, and displaying the dynamic transition on the same screen, this dynamic transition corresponding to a successive display of views including at least one intermediate view between said start view and said arrival view and implementing a set of geometric transformations, said dynamic transition presenting a given execution speed and duration.

2. The method as claimed in claim 1, wherein said perspective view (Vf) is formed from definition parameters that can be controlled by an operator.

3. The method as claimed in claim 1, wherein said plan view is a horizontal section viewed from above.

4. The method as claimed in claim 1, wherein said plan view is a vertical section viewed from the side.

5. The method as claimed in claim 1, wherein said geometric transformations include at least one of the following transformations:
    rotational;
    translational;
    homothetic.

6. The method as claimed in claim 1, including providing a sister view which corresponds to a perspective view comprising a symbol indicating the current position of the aircraft and meteorological data, and wherein, on a first auxiliary activation,
    displaying a dynamic transition on said screen in order to arrive at this sister view from one of the following views:
        said arrival view;
        another sister view comprising another perspective view including a symbol indicating the current position of the aircraft and meteorological data.

7. The method as claimed in claim 6, including generating said sister view from an initial view, some of the definition parameters of which, which can be controlled by an operator, having been modified.

8. The method as claimed in claim 1, including determining a sister view which corresponds to a perspective view comprising a symbol indicating the current position of the aircraft and meteorological data, and wherein, on a second auxiliary activation, displaying a dynamic transition on said screen in order, from this sister view, to arrive at one of the following views:
    said start view;
    said arrival view;
    another sister view comprising another perspective view including a symbol indicating the current position of the aircraft and meteorological data.

9. The method as claimed in claim 1, wherein at least one of the following criteria are taken into account to generate said dynamic transition:
    some characteristics of the aircraft;
    the current position of the aircraft and the flight phase entered into;
    the planned flight path of the aircraft;
    the distribution of precipitation in relation to the current position of the aircraft and to the planned flight path;
    wind direction and strength;
    the displacement and movement of precipitation cells; and
    possible avoidance maneuvers.

10. A device for displaying meteorological data on an aircraft screen, said device comprising, in addition to said screen:
    means for receiving in real time meteorological data that are capable of being displayed on said screen;
    means for generating at least one display of a plan view comprising a symbol indicating the current position of the aircraft; and
    means for generating a display of a perspective view comprising a symbol indicating the current position of the aircraft,
    means for performing an activation of a transition; and
    means for, during an activation, automatically generating and displaying on said screen a dynamic transition between a start view and an arrival view, each corresponding to a different one of said plan and perspective views, this dynamic transition corresponding to a successive display of views including at least one intermediate view between said start view and said arrival view and implementing a set of geometric transformations, said dynamic transition presenting a given execution speed and duration, said plan view and said perspective view comprising meteorological data, said perspective view being a unique graphic representation displaying a set of data contained in at least two plan views.

11. The device as claimed in claim 10, wherein it additionally comprises means for generating meteorological data in real time.

12. The device as claimed in claim 10, wherein it additionally comprises means allowing an operator to control parameters used by said device.

13. The device as claimed in claim 10, wherein it additionally comprises means allowing an automatic supply of parameters to said device.

14. The device as claimed in claim 10, wherein said means for generating and displaying a dynamic transition are capable of generating and displaying on the screen a dynamic transition relative to a view called a sister view corresponding to a perspective view comprising a symbol indicating the current position of the aircraft and meteorological data.

15. An aircraft comprising a device as defined in claim 10.

* * * * *